US012438819B2

United States Patent
Qiu et al.

(10) Patent No.: US 12,438,819 B2
(45) Date of Patent: Oct. 7, 2025

(54) SYSTEM FOR CLASSIFYING ENCRYPTED TRAFFIC BASED ON DATA PACKET

(71) Applicant: Guangzhou University, Guangdong (CN)

(72) Inventors: Jing Qiu, Guangdong (CN); Jie Ding, Guangdong (CN); Rongrong Chen, Guangdong (CN); Chengliang Gao, Guangdong (CN); Zhihong Tian, Guangdong (CN); Lihua Yin, Guangdong (CN); Guangxia Xu, Guangdong (CN); Shen Su, Guangdong (CN); Xiaoya Ni, Guangdong (CN); Fei Tang, Guangdong (CN); Minghao Hu, Guangdong (CN); Jiaxu Xing, Guangdong (CN); Qianlong Xiao, Guangdong (CN)

(73) Assignee: Guangzhou University, Guangzhou (CN)

( * ) Notice: Subject to any disclaimer, the term of this patent is extended or adjusted under 35 U.S.C. 154(b) by 162 days.

(21) Appl. No.: 18/386,251

(22) Filed: Nov. 1, 2023

(65) Prior Publication Data
US 2024/0064107 A1    Feb. 22, 2024

Related U.S. Application Data

(63) Continuation-in-part of application No. PCT/CN2022/133120, filed on Nov. 21, 2022.

(30) Foreign Application Priority Data

Mar. 18, 2022   (CN) .................... 202210271454.7

(51) Int. Cl.
  *H04L 47/2483*    (2022.01)
  *H04L 9/40*       (2022.01)
  *H04L 47/2441*    (2022.01)

(52) U.S. Cl.
  CPC ...... *H04L 47/2483* (2013.01); *H04L 47/2441* (2013.01); *H04L 63/1416* (2013.01)

(58) Field of Classification Search
  CPC ............ H04L 47/2483; H04L 47/2441; H04L 63/1416; H04L 63/1425
  See application file for complete search history.

(56) References Cited

U.S. PATENT DOCUMENTS 10,700,866 B2 *   6/2020   Antonatos .............. G06N 20/00
11,953,618 B2 *   4/2024   Regani .................... G01S 13/86
(Continued)

OTHER PUBLICATIONS

Blake Anderson et al., Identifying Encrypted Malware Traffic with Contextual Flow Data, AISec'16, Oct. 28, 2016, pp. 35-46.
(Continued)

*Primary Examiner* — Hieu T Hoang (57) ABSTRACT

Disclosed is a system for classifying encrypted traffic based on a data packet. The system includes a traffic capture module, a traffic analysis module, and a traffic classification module. The system collects data packets from a network flow to construct a machine learning model, so as to classify encrypted traffic and identify normal traffic and malicious traffic. In a process of constructing a feature matrix, basic spatial-temporal features, header features, load features, and statistical features are obtained. In addition, behavioral features of the data packets are obtained and used to demonstrate differences between the normal traffic and the malicious traffic. Moreover, the present disclosure focuses on a difference between different versions of an encryption protocol, especially a transport layer security (TLS) protocol, and introduces the difference into a model for analysis, so that the system classifies encrypted traffic in a more efficient manner.

7 Claims, 4 Drawing Sheets

(56) References Cited

U.S. PATENT DOCUMENTS

| | | | |
|---|---|---|---|
| 12,212,651 B2* | 1/2025 | Sarpatwar | G06F 18/214 |
| 2020/0219005 A1* | 7/2020 | Valdez | G06N 20/20 |
| 2020/0274815 A1* | 8/2020 | Sreevalsan | H04L 47/2441 |
| 2020/0366717 A1* | 11/2020 | Chaubey | H04L 63/20 |

OTHER PUBLICATIONS

Sung-Min Kim et al., A Method for Service Identification of SSL/TLS Encrypted Traffic with the Relation of Session ID and Server IP, APNOMS, 2015, pp. 487-490.

Eva Papadogiannaki et al., OTTer: A Scalable High-resolution Encrypted Traffic Identification Engine, pp. 1-20.

Wazen M. Shbair et al., Improving SNI-based HTTPS Security Monitoring, IEEE computer society, 2016, pp. 72-77.

Yanzhao Yang et al., Encrypted traffic classification based on packet characteristics, Journal of Guangzhou University (Natural Science Edition), Jun. 2022, pp. 60-66, vol. 21, No. 2.

International Search Report of PCT Patent Application No. PCT/CN2022/133120 issued on Feb. 20, 2023.

\* cited by examiner

SYSTEM FOR CLASSIFYING ENCRYPTED TRAFFIC BASED ON DATA PACKET

CROSS REFERENCE TO RELATED APPLICATIONS

The present application is a Continuation-In-Part Application of PCT Application No. PCT/CN2022/133120 filed on Nov. 21, 2022, which claims the benefit of Chinese Patent Application No. 202210271454.7 filed on Mar. 18, 2022. All the above are hereby incorporated by reference in their entirety.

TECHNICAL FIELD

The present disclosure relates to the field of network data technologies, and in particular, to a system for classifying encrypted traffic based on a data packet.

BACKGROUND

Traffic security is one of major concerns in the field of cyberspace security. Traffic generated by malware in a network may be identified by distinguish normal traffic from malicious traffic, which helps a firewall identify malicious connections and intrusions. Malware may be defined as a program aiming to damage a computer system, and poses a greatest threat to the field of information security today. Traffic classification may classify network traffic into corresponding categories, and plays a key role in many software programs such as network intrusion detection systems. In addition, traffic classification may help trace traffic sources, such as an application, an operating system, a browser type, and the like.

With the development of the network, traffic encryption methods are widely used. A body of a packet transmitted over the network is encrypted into ciphertext by using a transport layer security (TLS)/secure sockets layer (SSL) protocol. A previous method that relies on plaintext content for traffic classification is less used. Traffic encryption is a technology that encrypts an original data packet for information transmission over the network. Encryption ensures security and concealment of network communication, and protects user privacy. However, attackers always take advantage of such concealment to hide and deploy malicious code to perform remote control through a command, or to leak data. Therefore, how to classify encrypted traffic without decrypting a data packet becomes a major concern in cyberspace security studies.

The network mainly uses the TLS protocol to encrypt traffic. The TLS protocol is designed for Internet communication security. The TLS protocol performs a handshake between two applications that communicate with each other, to establish a reliable channel for encrypted communication. Conventional methods, such as a port-based method and a deep packet inspection technology, perform traffic classification based on plaintext data. However, these methods are inapplicable to encrypted traffic. Therefore, a method that classifies encrypted traffic through machine learning gradually draws attention of most scholars. A machine learning algorithm is proven the most suitable method for classifying encrypted traffic.

The machine learning algorithm has more advantages over a conventional traffic classification method. For example, the machine learning algorithm can classify encrypted traffic, and features high accuracy. A method for detecting encrypted traffic through machine learning performs statistical analysis on metadata of a data flow, and constructs a statistical attribute combination for the encrypted traffic as a fingerprint, so as to classify and identify the encrypted traffic. Researchers such as Kim S M, Gooy H, Kimm S, et al. propose a method for service identification of ssl/tls encrypted traffic with the relation of session ID and server IP. The method signs a service based on a field of certificate issuance information used in a certificate exchange process, and constructs a series table that includes certificates, session IDs, and IP addresses to match a traffic category. In addition, the researchers propose that a common practice for detecting encrypted traffic based on a rule is to establish a mapping table. Researchers such as Shbair, Cholez, Francois, et al compare a server name indication (SNI) with domain name information corresponding to an IP address, and use a reliable domain name system (DNS) service to perform consistency check on a real destination server and an SNI of a declaration, so as to monitor hypertext transfer protocol secure (HTTPS) traffic. Researchers such as Papadogiannake E, Halevidis C, Akritidis P, et al propose a pattern language that identifies a type of encrypted traffic by periodically matching a fixed encryption mode (such as an occurrence frequency of a related data packet or a location of a data packet).

In the foregoing methods, feature fields need to be manually filtered and an extracted rule needs to be matched, so as to classify encrypted traffic. These methods are also referred to as methods for rule-based encrypted traffic detection. These methods are lightweight, fast, and easy to construct, but need to manually filter feature fields. In addition, a mapping table can be constructed only for traffic of a known category to perform corresponding matching, and detection may be easily bypassed by an attacker by using a method of concatenating or forging related data packet fields. Consequently, a high false positive rate is caused. In 2016, Cisco provided a method for identifying a risk in encrypted traffic by analyzing TLS handshake metadata and a context. The method uses a time series and statistical data as features. The method not only can classify unencrypted traffic, but also can classify traffic by analyzing an encryption protocol of encrypted traffic. In a TLS handshake protocol phase, data of two parties are transmitted still in a form of plaintext, until a channel for encrypted communication is established. Instead of simply constructing a rule mapping table, this method effectively pays attention to features of traffic data and interaction information of data in an encryption handshake phase. Therefore, this method features high scalability and accuracy, and can adapt to complex and changeable network environments.

SUMMARY

The present disclosure provides a system for classifying encrypted traffic based on a data packet, to resolve the problem mentioned in the background art.

To resolve the problem, the present disclosure provides a system for classifying encrypted traffic based on a data packet. The system includes a traffic capture module, a traffic analysis module, and a traffic classification module.

The traffic capture module is configured to filter data packet information in a network flow by identifying an IP address, a port number, a protocol type, and a flag bit in traffic, to obtain flow data, where the network flow refers to all data packets transmitted between two IP addresses and ports corresponding to the two IP addresses.

The traffic analysis module is configured to: extract TLS, hypertext transfer protocol (HTTP), and DNS protocol information and related fields from the flow data; extract information about data packets in the flow data; and perform a cluster analysis on information about sizes, flow directions, and delays of the data packets, to extract spatial-temporal features, header features, load features, and statistical features from the flow data. The spatial-temporal features refer to temporal attributes and spatial attributes of data packets that are normally sent in a network traffic transmission process. The header features include traffic 5-tuple information, DNS information, and HTTP information. The load features refer to content encapsulated in the flow data. The statistical features include an average packet length, a maximum packet length, an average inter-packet delay, a ratio of a quantity of uplink data packets to a quantity of downlink data packets, and a ratio of a quantity of uplink bytes to a quantity of downlink bytes.

The traffic classification module is configured to classify normal data packets and malicious data packets through k-means clustering.

An input dataset is in a format of $D=\{x_1, x_2, \ldots, x_i\}$, and an output is a classification result $C=\{C_1, C_2\}$, where $C_1$ and $C_2$ represent labels of normal traffic and malicious traffic respectively. A specific classification process includes the following steps: First, randomly select two samples from the dataset D, to constitute a centroid set $\{\mu_1, \mu_2\}$, where a centroid of the set is represented by $\mu_j$. Then, calculate a distance between each sample $x_i$ and the centroid $\mu_j$, where the distance is calculated based on the following formula:

$$d_{ij}=\|x_i-\mu_j\|_2^2$$

Next, recalculate a centroid of the set C based on the following formula:

$$\mu_j = \frac{1}{|c_j|} \sum_{x_i \in C_j} x_i$$

Subsequently, calculate distances between each sample and two centroids; allocate each sample to a centroid that is closest to the sample, where the centroid and the sample that is allocated to the centroid constitute a cluster; and after all samples are allocated, output a clustering result if no centroid vector is changed, where the following clustering result is finally output:

$$C=\{C_1, C_2\}$$

Further, after categories of the normal data packets and the malicious data packets in the traffic are obtained, calculate a proportion of the normal data packets in the traffic, a proportion of the malicious data packets in the traffic, and a ratio of the normal data packets to the malicious data packets. Then, add, as parameters to a feature matrix, the proportion of the normal data packets in the traffic, the proportion of the malicious data packets in the traffic, and the ratio of the normal data packets to the malicious data packets, to finally obtain a sample set $S=\{S\_1, S\_2 | x_i \in S\}$, where $x_i$ is a sample in the set S.

After the sample set is input, use a light gradient-boosting machine (LightGBM) model for classification, so as to obtain a traffic classification result, where a Gini coefficient expression of probability distribution is:

$$\text{Gini}(p)=2p(1-p)$$

p represents a probability of being normal traffic, a loss function that is used is a log-likelihood loss function, and the log-likelihood loss function is calculated based on the following formula:

$$L = -\frac{1}{N}\sum_{i=1}^{N}(y_i \log p_i + (1-y_i)\log(1-p_i))$$

L represents the loss function, N represents a quantity of samples, $y_i$ represents a true category of an input instance, and $p_i$ represents a predicted probability that the input instance belongs to a normal traffic category.

Preferably, the temporal attributes of the data packets include time points at which the data packets are sent and inter-packet delays.

Preferably, the spatial attributes of the data packets include lengths of the data packets, directions in which the data packets are sent, and a quantity of the data packets.

Preferably, the DNS information includes a DNS domain name, a return code, a DNS address, and time to live (TTL). The header features further include a feature extracted from the DNS information, where the feature extracted from the DNS information includes at least one of a popularity rank of a website to be accessed, an Alexa rank of the website, a length and a character distribution rule of a domain name of the website, and Gaussian distribution of the domain name.

Preferably, the HTTP information extracted from the flow data includes an HTTP protocol type, a request method, a status code, and a Content-Type field.

Preferably, the ratio of the quantity of uplink data packets to the quantity of downlink data packets and the ratio of the quantity of uplink bytes to the quantity of downlink bytes are obtained in the following manner:
  determining uplink traffic and downlink traffic by defining a traffic direction based on whether data is sent from a client or a server, where the uplink traffic is traffic sent by the client to the server, and the downlink traffic is traffic received by the client from the server; and
  calculating the ratio of the quantity of uplink data packets to the quantity of downlink data packets and the ratio of the quantity of uplink bytes to the quantity of downlink bytes based on the uplink traffic and the downlink traffic.

Preferably, attributes of a single data packet include a quantity of bytes, a transmission direction, and an inter-packet delay, where the average packet length, the maximum packet length, and the average inter-packet delay are calculated based on attributes of data packets.

Compared with the prior art, the present disclosure has the following beneficial effects: The system for classifying encrypted traffic based on a data packet collects data packets from a network flow to construct a machine learning model, so as to classify encrypted traffic and identify normal traffic and malicious traffic. In a process of constructing a feature matrix, basic spatial-temporal features, header features, load features, and statistical features are obtained. In addition, behavioral features of the data packets are obtained and used to demonstrate differences between the normal traffic and the malicious traffic.

BRIEF DESCRIPTION OF THE DRAWINGS

FIG. 3 is a schematic diagram of feature fields of data packets according to the present disclosure.

DESCRIPTION OF EMBODIMENTS

The following clearly and completely describes the technical solution in embodiments of the present disclosure with reference to the accompanying drawings in the embodiments of the present disclosure. Apparently, the described embodiment is merely a part rather than all of the embodiments of the present disclosure. All other embodiments obtained by a person of ordinary skill in the art based on the embodiment of the present disclosure without creative efforts shall fall within the protection scope of the present disclosure.

Refer to FIG. 1 to FIG. 4, the present disclosure provides a technical solution, that is, a system for classifying encrypted traffic based on a data packet. The system includes a traffic capture module 10, a traffic analysis module 20, and a traffic classification module 30.

Figure 1:
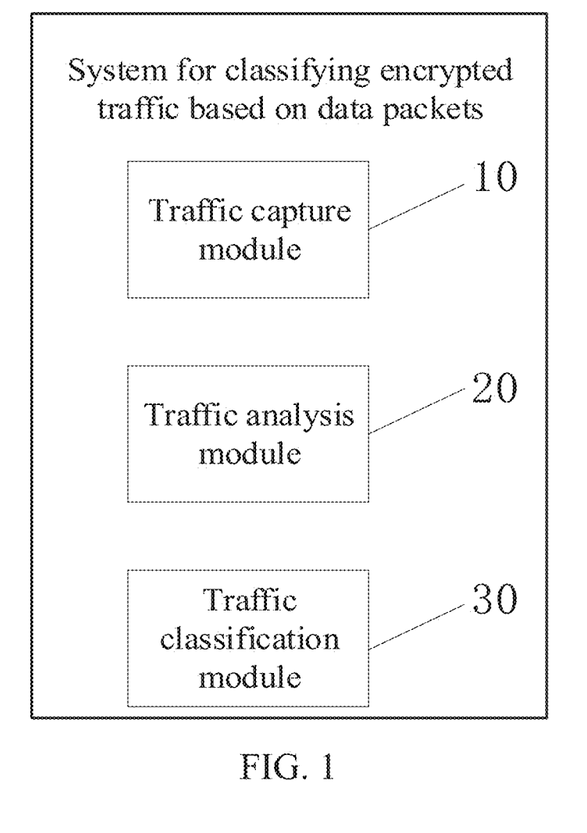
FIG. 1 is a block diagram of a structure of a system for classifying encrypted traffic according to an embodiment of the present disclosure.

The traffic capture module 10 is configured to filter data packet information in a network flow by identifying information such as an IP address, a port number, a protocol type, and a flag bit in traffic, to obtain reliable flow data. The network flow refers to all data packets transmitted between two IP addresses and ports corresponding to the two IP addresses. The data packets include a large quantity of important data packets related to information interaction, and also include many data packets retransmitted due to a timeout, out-of-order packets, and incorrect data packets.

The traffic analysis module 20 is configured to extract TLS, HTTP, and DNS protocol information and related fields from the flow data; extract information about data packets in the flow data; and perform a cluster analysis on sizes, flow directions, and delays of the data packets. The system extracts spatial-temporal features, header features, load features, and statistical features from the flow data. It should be noted that, in contrast to statistical information of data packets in previous researches, data packet behavior in data packet information extracted in this technical solution is used as an important feature and input into a model for training.

The spatial-temporal features refer to temporal attributes and spatial attributes of data packets that are normally sent in a network traffic transmission process. The temporal attributes of the data packets include time points at which the data packets are sent, inter-packet delays, and the like. The spatial attributes of the data packets include lengths of the data packets, directions in which the data packets are sent, a quantity of the data packets, and the like.

The header features include 5-tuple information of the traffic, DNS information, and HTTP information. The DNS information includes a DNS domain name, a return code, a DNS address, and TTL. In addition, another feature may be extracted from the DNS information. For example, the another feature indicates a popularity rank of a website to be accessed, such as an Alexa rank of the website. For example, the another feature indicates a length and a character distribution rule of a domain name of the website, such as Gaussian distribution of the domain name. An HTTP is a most widely used protocol, and is usually used in a web browser and a simple mail transfer protocol (SMTP) service. Features that can be extracted from the HTTP information include an HTTP protocol type, a request method, a status code, a Content-Type field, and the like.

The load features refer to content encapsulated in the flow data, such as an encryption protocol. Before a secure encrypted communication channel is established, a client and a server need to exchange data packets to confirm identity information of each other. This process is usually referred to as a handshake phase of the encryption protocol. In TLS, the client and the server need to exchange cipher suites respectively supported by each other, so as to select an appropriate encryption algorithm to encrypt data packets. To authenticate identities of the client and the server, the server sends a certificate to the client to authenticate identifies of two parties that perform communication. Notably, most researches on encrypted traffic are based on TLS 1.2. However, TLS 1.3 already starts to get popular. In contrast to TLS 1.2, less packets are sent and less handshakes are performed in a handshaking procedure in TLS 1.3. However, this also presents more challenges to encrypted traffic classification.

The statistical features include an average packet length, a maximum packet length, an average inter-packet delay, a ratio of a quantity of uplink data packets to a quantity of downlink data packets, and a ratio of a quantity of uplink bytes to a quantity of downlink bytes. The statistical features may be obtained from the traffic. A single data packet has three attributes: a quantity of bytes, a transmission direction, and an inter-packet delay. Attributes such as the average packet length, the maximum packet length, the average inter-packet delay, and the like may be calculated based on attributes of data packets. A traffic direction may be simply defined based on whether data is sent from the client or the server. Uplink traffic is traffic sent by the client to the server, and downlink traffic is traffic received by the client from the server. On this basis, the ratio of the quantity of uplink data packets to the quantity of downlink data packets and the ratio of the quantity of uplink bytes to the quantity of downlink bytes may be further calculated. The statistical features can differentiate normal traffic from malicious traffic by values, and are important for classifying encrypted traffic. However, to obtain the statistical features, a classifier needs to obtain a large quantity of data packets from a flow or session. Therefore, the statistical features can be used only for offline classification.

Figure 2:
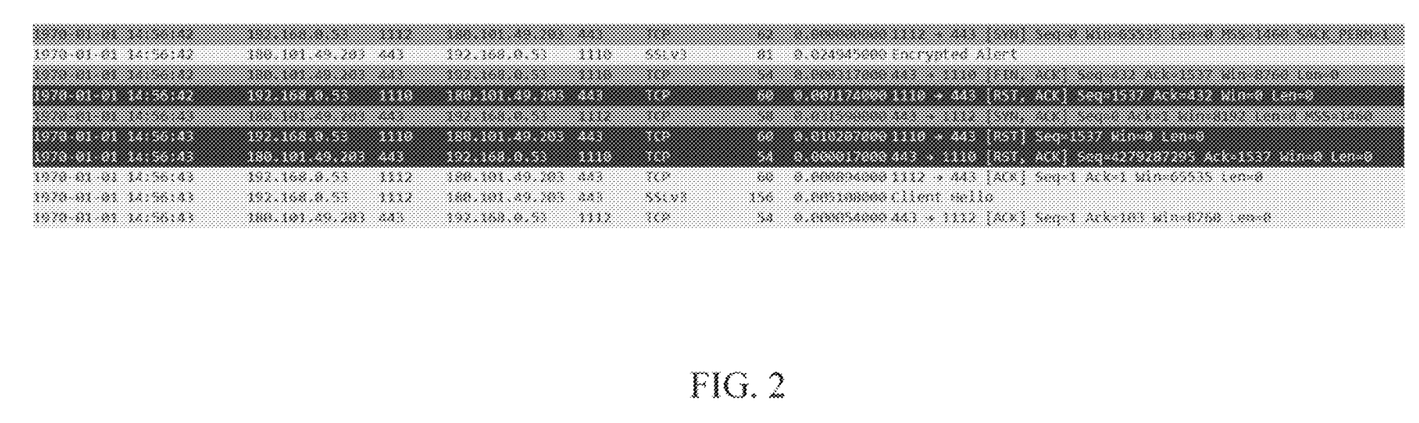
FIG. 2 is a schematic diagram of traffic packets in a dataset according to the present disclosure.

It should be noted that the model in the present disclosure emphasizes behavioral features of data packets. Different data packets have different behavior. Data packet behavior can be normal or malicious. Normal traffic may include a malicious traffic packet, and malicious traffic may also include a normal traffic packet.

Figure 4:
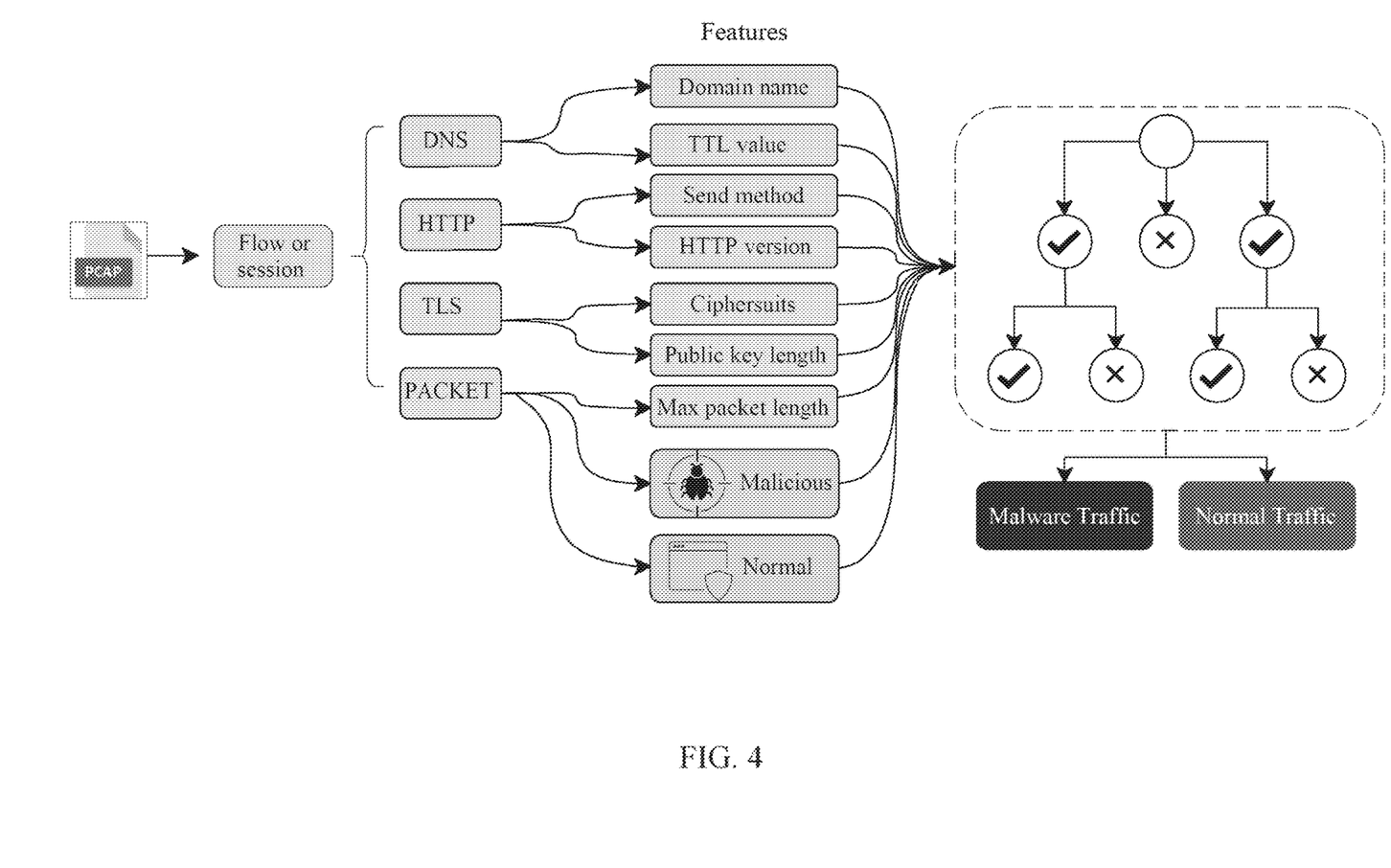
FIG. 4 is a schematic diagram of a model architecture according to the present disclosure.

The traffic analysis module 30 is configured to classify normal data packets and malicious data packets through k-means clustering. An input dataset is in a format of $D=\{x_1, x_2, \ldots, x_i\}$, and an output is a classification result $C=\{C_1, C_2\}$. $C_1$ and $C_2$ represent labels of the normal traffic and the malicious traffic respectively, and $x_i$ represents a four-dimensional vector. Each $x_i$ presents four types of features of a traffic packet. To be specific, each $x_i$ includes a spatial-temporal feature, a header feature, a load feature, and a statistical feature. A specific classification process includes the following steps: First, randomly select two samples from the dataset D, to constitute a centroid set $\{\mu_1, \mu_2\}$, where a centroid of the set is represented by $\mu_j$. Then, calculate a distance between each sample $x_i$ and the centroid $\mu_j$, where the distance is calculated based on the following formula:

$$d_{ij}=\|x_i-\mu_j\|_2^2$$

Next, recalculate a centroid of the set C based on the following formula:

$$\mu_j = \frac{1}{|c_j|}\sum_{x_i \in C_j} x_i$$

Subsequently, calculate distances between each sample and two centroids; allocate each sample to a centroid that is closest to the sample, where the centroid and the sample that is allocated to the centroid constitute a cluster; and after all samples are allocated, output a clustering result if no centroid vector is changed. In this system, the following clustering result is finally output:

$$C=\{C_1, C_2\}$$

Further, after categories of the normal data packets and the malicious data packets in the traffic are obtained, calculate a proportion of the normal data packets in the traffic, a proportion of the malicious data packets in the traffic, and a ratio of the normal data packets to the malicious data packets. Then, add, as parameters to a feature matrix, the proportion of the normal data packets in the traffic, the proportion of the malicious data packets in the traffic, and the ratio of the normal data packets to the malicious data packets, to finally obtain a sample set S={S_1, S_2|εS}, where $x_i$ is a sample in the set S.

After the sample set is input, use a LightGBM model for classification, so as to obtain a traffic classification result, where the traffic classification result indicates normal traffic or malicious traffic.

A Gini coefficient expression of probability distribution is:

$$\text{Gini}(p)=2p(1-p)$$

p represents a probability of being normal traffic, a loss function that is used is a log-likelihood loss function, and the log-likelihood loss function is calculated based on the following formula:

$$L = -\frac{1}{N}\sum_{i=1}^{N}(y_i \log p_i + (1-y_i)\log(1-p_i))$$

L represents the loss function, N represents a quantity of samples, $y_i$ represents a true category of an input instance, and $p_i$ represents a predicted probability that the input instance belongs to a normal traffic category.

It should be noted that the LightGBM is a framework for implementing a gradient-boosted decision tree (GBDT) algorithm. The LightGBM performs iterative training through a weak classifier, to obtain an optimal model. The LightGBM supports efficient computing, and features a faster training speed, higher accuracy, and the like. The LightGBM uses a Gini coefficient instead of an information gain ratio. A smaller Gini coefficient indicates lower impurity and better performance.

In this embodiment of the present disclosure, the traffic capture module 10, the traffic analysis module 20, and the traffic classification module 30 each may include one or more processors or controllers or chips that each have a communication interface and can implement a communication protocol, and may further include a memory, a related interface, a system transmission bus, and the like if necessary. The processor or the controller or the chip executes program-related code to implement a corresponding function. Alternatively, the traffic capture module 10, the traffic analysis module 20, and the traffic classification module 30 may share an integrated chip or share a device such as a processor, a controller, or a memory. The shared processor or controller or memory executes program-related code to implement a corresponding function.

The system for classifying encrypted traffic based on a data packet integrates an encryption protocol and a data packet feature, which improves accuracy of identifying malicious traffic. In addition, the system supports a plurality of TLS versions. With the development of the network, the encryption protocol constantly iterates. For example, TLS 1.3 is widely used since it was proposed in 2018. This ensures that the system can be adapted to iteration of the encryption protocol, and is highly applicable to a current network environment. The present disclosure pays attention to an encryption protocol, especially a difference between different versions of a TLS protocol; and introduces the encryption protocol into a model for analysis. Therefore, the system can classify encrypted traffic in a more efficient manner.

Although the embodiment of the present disclosure has been illustrated and described, it should be understood that a person of ordinary skill in the art may make various changes, modifications, replacements and variations to the foregoing embodiment without departing from the principle and spirit of the present disclosure, and the scope of the present disclosure is limited by the appended claims and their legal equivalents.

The invention claimed is:

1. A system for classifying encrypted traffic based on a data packet, comprising a traffic capture module, a traffic analysis module, and a traffic classification module, wherein the traffic capture module is configured to filter data packet information in a network flow by identifying an IP address, a port number, a protocol type, and a flag bit in traffic, to obtain flow data, wherein the network flow refers to all data packets transmitted between two IP addresses and ports corresponding to the two IP addresses;

the traffic analysis module is configured to: extract transport layer security (TLS), hypertext transfer protocol (HTTP), and domain name system (DNS) protocol information and related fields from the flow data; extract information about data packets in the flow data; and perform a cluster analysis on information about sizes, flow directions, and delays of the data packets, to extract spatial-temporal features, header features, load features, and statistical features from the flow data, wherein the spatial-temporal features refer to temporal attributes and spatial attributes of data packets that are normally sent in a network traffic transmission process, the header features comprise 5-tuple information of the traffic, DNS information, and HTTP information, the load features refer to content encapsulated in the flow data, and the statistical features comprise an average packet length, a maximum packet length, an average inter-packet delay, a ratio of a quantity of uplink data packets to a quantity of downlink data packets, and a ratio of a quantity of uplink bytes to a quantity of downlink bytes; and the traffic classification module is configured to classify normal data packets and malicious data packets through k-means clustering, wherein an input dataset is in a format of D={$x_1, x_2, \ldots, x_i$}, and an output is a classification result C={$C_1, C_2$}, wherein $C_1$ and $C_2$ represent labels of normal traffic and malicious traffic respectively; and a specific classification process comprises: first, randomly selecting two samples from the dataset D, to constitute a centroid set {$\mu_1, \mu_2$}, wherein a centroid of the set is represented by $\mu_j$; then, calculating a distance between each sample $x_i$ and the centroid $\mu\mu_j$, wherein the distance is calculated based on the following formula:

$$d_{ij}=\|x_i-\mu_j\|_2^2$$

next, recalculating a centroid of the set C based on the following formula:

$$\mu_j = \frac{1}{|C_i|}\sum_{xi\in C_j} x_i$$

subsequently, calculating distances between each sample and two centroids; allocating each sample to a centroid that is closest to the sample, wherein the centroid and the sample that is allocated to the centroid constitute a cluster; and after all samples are allocated, outputting a clustering result if no centroid vector is changed, wherein the following clustering result is finally output:

$$C=\{C_1,C_2\}$$

after categories of the normal data packets and the malicious data packets in the traffic are obtained, calculating a proportion of the normal data packets in the traffic, a proportion of the malicious data packets in the traffic, and a ratio of the normal data packets to the malicious data packets; and adding, as parameters to a feature matrix, the proportion of the normal data packets in the traffic, the proportion of the malicious data packets in the traffic, and the ratio of the normal data packets to the malicious data packets, to finally obtain a sample set S={S_1, S_2|x$_i$∈S}, wherein x$_i$ is a sample in the set S;

after the sample set is input, using a light gradient-boosting machine (LightGBM) model for classification, so as to obtain a traffic classification result, wherein a Gini coefficient expression of probability distribution is:

$$Gini(p)=2p(1-p)$$

wherein p represents a probability of being normal traffic, a loss function that is used is a log-likelihood loss function, and the log-likelihood loss function is calculated based on the following formula:

$$L = -\frac{1}{N}\sum_{i=1}^{N}(y_i\log p_i + (1-y_i)\log(1-p_i))$$

wherein L represents the loss function, N represents a quantity of samples, y$_i$ represents a true category of an input instance, and p$_i$ represents a predicted probability that the input instance belongs to a normal traffic category.

2. The system for classifying encrypted traffic based on a data packet according to claim 1, wherein the temporal attributes of the data packets comprise time points at which the data packets are sent and inter-packet delays.

3. The system for classifying encrypted traffic based on a data packet according to claim 1, wherein the spatial attributes of the data packets comprise lengths of the data packets, directions in which the data packets are sent, and a quantity of the data packets.

4. The system for classifying encrypted traffic based on a data packet according to claim 1, wherein the DNS information comprises a DNS domain name, a return code, a DNS address, and time to live (TTL); and the header features further comprise a feature extracted from the DNS information, wherein the feature extracted from the DNS information comprises at least one of a popularity rank of a website to be accessed, an Alexa rank of the website, a length and a character distribution rule of a domain name of the website, and Gaussian distribution of the domain name.

5. The system for classifying encrypted traffic based on a data packet according to claim 1, wherein the HTTP information extracted from the flow data comprises an HTTP protocol type, a request method, a status code, and a Content-Type field.

6. The system for classifying encrypted traffic based on a data packet according to claim 1, wherein the ratio of the quantity of uplink data packets to the quantity of downlink data packets and the ratio of the quantity of uplink bytes to the quantity of downlink bytes are obtained in the following manner:

determining uplink traffic and downlink traffic by defining a traffic direction based on whether data is sent from a client or a server, wherein the uplink traffic is traffic sent by the client to the server, and the downlink traffic is traffic received by the client from the server; and calculating the ratio of the quantity of uplink data packets to the quantity of downlink data packets and the ratio of the quantity of uplink bytes to the quantity of downlink bytes based on the uplink traffic and the downlink traffic.

7. The system for classifying encrypted traffic based on a data packet according to claim 1, wherein attributes of a single data packet comprise a quantity of bytes, a transmission direction, and an inter-packet delay, wherein the average packet length, the maximum packet length, and the average inter-packet delay are calculated based on attributes of data packets.

* * * * *